US009788210B2

(12) United States Patent
Arad

(10) Patent No.: US 9,788,210 B2
(45) Date of Patent: Oct. 10, 2017

(54) METHODS AND SYSTEMS FOR ADAPTIVE BUFFER ALLOCATIONS IN SYSTEMS WITH ADAPTIVE RESOURCE ALLOCATION

(71) Applicant: Taqua WBH, LLC, Richardson, TX (US)

(72) Inventor: Seyed Mohammad Ali Arad, Richmond Hill (CA)

(73) Assignee: SONUS NETWORKS, INC., Westford, MA (US)

( * ) Notice: Subject to any disclaimer, the term of this patent is extended or adjusted under 35 U.S.C. 154(b) by 555 days.

(21) Appl. No.: 13/915,280

(22) Filed: Jun. 11, 2013

(65) Prior Publication Data

US 2014/0362698 A1 Dec. 11, 2014

(51) Int. Cl.
| | |
|---|---|
| H04L 12/807 | (2013.01) |
| H04L 12/861 | (2013.01) |
| H04W 16/04 | (2009.01) |
| H04L 12/801 | (2013.01) |
| H04L 12/931 | (2013.01) |

(52) U.S. Cl.
CPC ............ *H04W 16/04* (2013.01); *H04L 47/10* (2013.01); *H04L 47/27* (2013.01); *H04L 49/00* (2013.01); *H04L 49/90* (2013.01)

(58) Field of Classification Search
CPC ..... H04L 47/41; H04L 47/2441; H04L 47/30; H04L 747/32; H04L 12/5693; H04L 47/10; H04L 47/32; H04L 49/90; H04L 47/27; H04W 16/04
See application file for complete search history.

(56) References Cited

U.S. PATENT DOCUMENTS 7,149,664 B1 * 12/2006 Firoiu ................. H04L 12/5693
370/230
7,191,249 B1 * 3/2007 Lacroute ................. G06F 15/17
709/224

(Continued)

OTHER PUBLICATIONS

International Search Report and Written Opinion issued for PCT/US2013/072573, dated Apr. 16, 2014, 9 pages.

*Primary Examiner* — Michael Thier
*Assistant Examiner* — Brian Cox
(74) *Attorney, Agent, or Firm* — Stephen T. Straub; Ronald P. Straub; Michael P. Straub

(57) ABSTRACT

Systems disclosed herein may allocate buffer space using methods, which prevent other resource allocation methods from apportioning the other resources in a way that inhibits system needs from being met. As such, buffer space may be dynamically allocated without impeding other resource allocation by basing the buffer space allocation at least on the traffic priority class that each allocated buffer will handle. Alternatively, buffer space may be dynamically allocated without impeding other resource allocation by basing the buffer space allocation at least on the bandwidth needs of each respective buffer being allocated. Alternatively still, buffer space may be dynamically allocated without impeding other resource allocation by basing the buffer space allocation at least on a function of the traffic priority class that each allocated buffer will handle and the bandwidth needs of each respective buffer being allocated.

16 Claims, 4 Drawing Sheets

(56) References Cited

U.S. PATENT DOCUMENTS

| | | | |
|---|---|---|---|
| 2008/0130670 A1* | 6/2008 | Kim | H04W 72/1242 |
| | | | 370/412 |
| 2008/0256272 A1* | 10/2008 | Kampmann | H04L 29/06027 |
| | | | 710/57 |
| 2010/0008228 A1* | 1/2010 | Chakravorty | H04L 47/10 |
| | | | 370/236 |
| 2013/0155859 A1* | 6/2013 | Kwan | H04L 49/9005 |
| | | | 370/235 |
| 2013/0205051 A1* | 8/2013 | Wang | H04L 49/90 |
| | | | 710/56 |

* cited by examiner

METHODS AND SYSTEMS FOR ADAPTIVE BUFFER ALLOCATIONS IN SYSTEMS WITH ADAPTIVE RESOURCE ALLOCATION

CROSS-REFERENCE TO RELATED APPLICATIONS

This application is related to co-pending and commonly assigned U.S. patent application Ser. No. 13/284,669 entitled "METHOD AND SYSTEM FOR ADAPTIVE RESOURCE ALLOCATION," filed on Oct. 28, 2011, the disclosure of which is hereby incorporated herein by reference.

TECHNICAL FIELD

The present application is related to implementation of a communication network, and more specifically to adaptive buffer allocation within a communication network.

BACKGROUND OF THE INVENTION

Communication between nodes in a communication network involves the allocation of resources among the nodes for uplink and downlink traffic. As an example, traffic is transmitted and received by one or more nodes of a network, wherein a centralized controller controls communication with the nodes in a network. For instance, the centralized controller may use any number of communication schemes for transferring information to and from the remote units, and often information is communicated using data packets with frames. As information is communicated, the packets may be stored (e.g., queued) in a buffer for an amount of time until the processor of the centralized node or the processor of the remote unit is ready to transmit the information.

Communication networks may comprise a plurality of buffers. For example, each remote node may have a buffer for uplink (UL) traffic and the centralized node may have a buffer for downlink (DL) traffic. The centralized node's buffer usually has a finite amount of buffer storage space, and DL buffer is often allocated (e.g., split) such that a portion of the finite amount of buffer storage space services each node in communication with the centralized node. Traditionally allocation of DL buffer storage space is statically and equally applied (to the extent possible) based on the number of remote nodes in the system. For example, if there are four remote nodes in a network, the DL buffer space would be equally divided into fourths, such that each remote node is allocated one-fourth of the total available buffer space. DL buffer space allocation usually remains static as long as the number of connected remote nodes does not change, and may only change when a remote node joins or leaves the network connection with the centralized node.

A remote node's traffic will vary depending on several variables, including time of day, activity of a population, and a type of community the network services. For instance, if a communication network including a centralized node and one or more remote nodes services a business district, there may be high demand throughout business hours as people work within the area, but less demand during non-business hours as people leave the area. In addition, certain areas served by remote nodes may encounter a spike in traffic demand during certain periods. As an example, people may travel to various areas within the community to have lunch, thereby creating a temporary increase in demand for traffic during those lunch hours. A static allocation of resources is unable to adequately handle an increase or decrease in demand from one or more remote nodes.

Such static allocation of DL buffer space does not take into account traffic activity, such as the change in the type and volume of traffic encountered by the remote nodes. When a remote node experiences a heavier traffic flow, the DL buffer space allocated to that node becomes more filled with information, which is queued, and the information waits to be processed. As more and more information is queued in the DL buffer allocated to that node, the buffer's queue length grows. If the queue becomes full and additional information is received, this may cause a queue overflow which results in information loss. Similar problems may occur in the UL buffers as well.

Some networks allocate other system resources, for example, bandwidth, based on the queue length of the DL buffer space and/or on the queue length of the UL buffer space. For example, a system may determine that the DL buffer allocated to a remote node has a queue length that is twice as long as the queues of DL buffers to other remote nodes. Based on such a determination, the system may decide that the remote node with the longer queue has more traffic flow at the moment. Thus, based on the length of the queue, the system may allocate more bandwidth to that remote unit.

Each remote node may have a mix of different traffic flows in DL and/or UL direction, for example, high priority (HP) data traffic, real-time voice and video traffic, streaming video traffic, and best effort (BE) data traffic. Each remote node could have a number of traffic classes, for supporting traffic flows with different priorities and bandwidth requirements. Each traffic class is typically assigned a portion of the DL and/or UL buffer space allocated to the remote node. The size of each remote node's DL and UL buffer space is usually statically divided among all of its traffic classes. When bandwidth allocation is based on a function of the queue length of a remote node's DL and/or UL buffer space, the present inventor has discovered that unexpected problems arise causing such a bandwidth allocation to be become skewed. For example, the queue size of a remote unit with a higher priority traffic with low data flow may be deceptively short thereby causing bandwidth allocation calculations to yield a bandwidth allocation that is lower that the bandwidth needed for a node with a high priority traffic to properly perform.

For instance, higher priority traffic usually involves the transfer of less data. For example, voice traffic is often transferred with a higher traffic priority class as compared to web surfing. The transfer of voice involves the transfer of less data as compared to web surfing because voice traffic with low data flow comprise less data as compared to web surfing, which transfers much more data back and forth (e.g., downloading multiple websites, videos, and/or the like). As such, because higher priority traffic tends to communicate less data, the size of the higher priority traffic queue will be typically shorter than the size of a lower priority traffic queue. If the size of the high priority traffic queue is deceptively short, when allocating bandwidth to the remote units based on their queue lengths, the unit with the higher priority traffic will likely be allocated minimal bandwidth even though it should be allocated more bandwidth to ensure that the high priority traffic is transferred at a speed that accommodates its high priority classification.

In short, if the buffer space is assigned to the traffic flows of remote nodes mainly based on their data rate requirements without any consideration of their priorities, determining bandwidth allocation based on the queue length of the remote node's UL buffer or allocated DL buffer does not necessarily result in a proper allocation of bandwidth, because the queue lengths of buffers handling higher priority traffic is often deceptively short. As such, having a typical buffer size allocation for each remote node based on bandwidth needs of its traffic flows could prevent the system from effectively handling the priority of traffic flows over time, and could prevent bandwidth allocations which are based on queue length, from yielding effective results.

BRIEF SUMMARY OF THE INVENTION

Systems and methods, which dynamically partition finite buffer space assigned without impeding other resource allocation operations, are disclosed herein. In some systems, other resource allocations (e.g. bandwidth allocations) may be made contingent on the queue lengths of partitioned buffers. As such, systems disclosed herein may allocate buffer space using methods, which prevent the other resource allocation methods from apportioning the other resources in a way that inhibits system needs from being met. As such, buffer space may be allocated without impeding other resource allocation by basing the buffer space allocation at least on the traffic priority class that each allocated buffer will handle. Alternatively, buffer space may be dynamically allocated without impeding other resource allocation by basing the buffer space allocation at least on the bandwidth needs of each respective buffer being allocated. Alternatively still, buffer space may be dynamically allocated without impeding other resource allocation by basing the buffer space allocation at least on a function of the traffic priority class that each allocated buffer will handle and the bandwidth needs of each respective buffer being allocated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
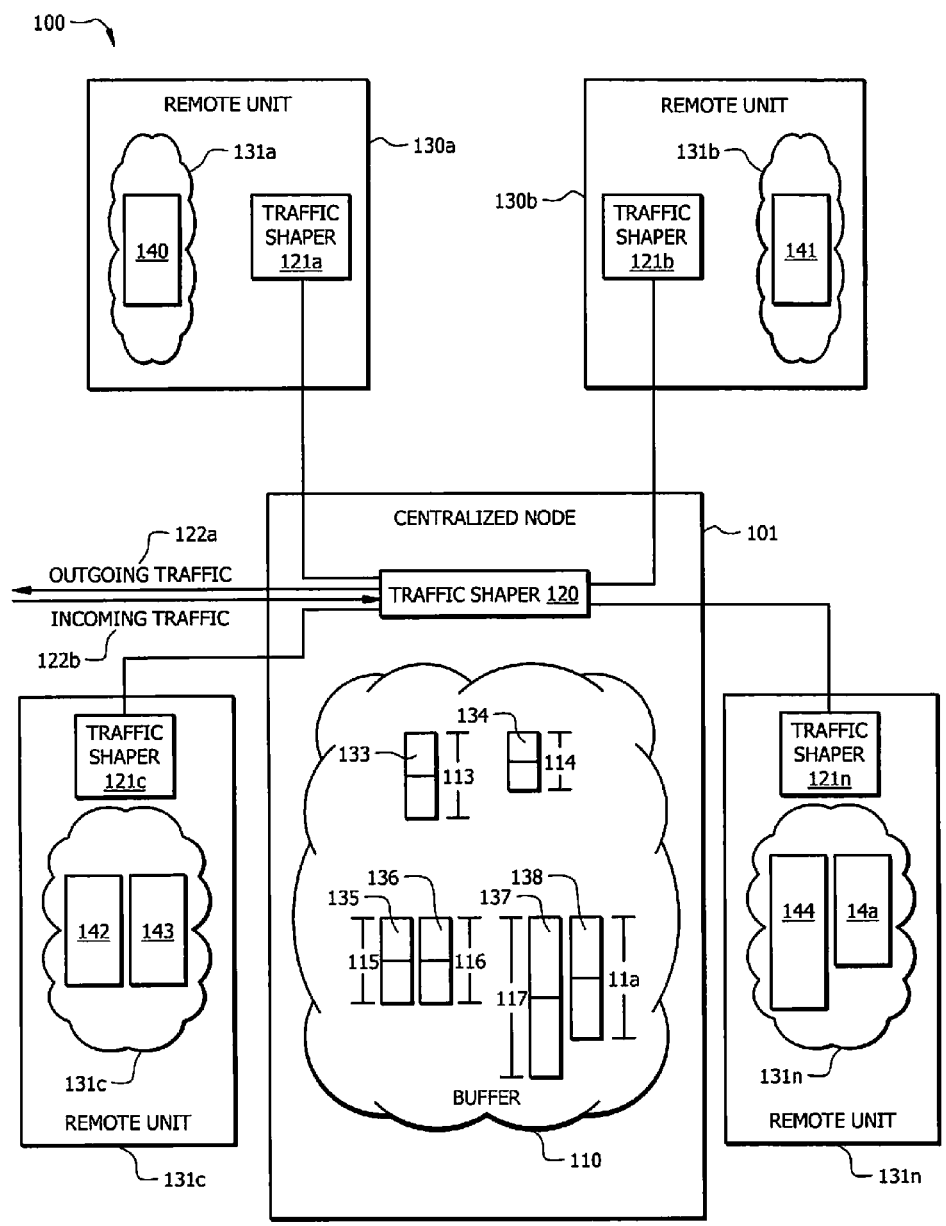
FIG. 1 illustrates an exemplary communication network, which allocates buffer space.

FIG. 1 shows an example aspect of a communication network 100 that comprises a centralized node 101 that is operable to receive and transmit data. Centralized node 101 may be a base station, an access point, a server, a combination of a plurality of servers, a centralized processor and/or the like, and comprises one or more processors and one or more memories. Centralized node 101 may provide backhaul data services in communication systems. Centralized node 101 is in communication connection with at least one remote unit (e.g., remote units 130$a$-130$n$). System 100 is scalable in that one or more remote units may be added to or taken away from the system.

Remote units 130$a$-130$n$ may be nodes, stations, femtocells, servers, user end equipment, computers, laptops, PDAs, cell phones, smart phones, processors, and the like, and/or any combination thereof. Remote units 130$a$-130$n$ comprise one or more processors and one or more memories. Remote units 130$a$-130$n$ may also each comprise a buffer 131$a$-131$n$, which comprises data that was received from or may be communicated to centralized node 101. Buffers 131$a$-131$n$ may be uplink (UL) buffers and may each be partitioned into respective partitioned buffers (e.g. 140-14A). Each respective partitioned buffer (140-14A) may be partitioned such that it is operable to handle information of a certain traffic priority class type, such as high priority (HP) traffic, real-time voice and video traffic, streaming video traffic, best efforts (BE) traffic, and/or the like.

Centralized node 101 and remote units 130$a$-130$n$ may communicate via wireless channels, wired channels, and/or any combination thereof. Centralized node 101 and remote units 130$a$-130$n$ may communicate using time division duplexing (TDD), frequency division duplexing (FDD), time division multiplexing (TDM), time division multiplexing access (TDMA), frequency division multiplexing (FDM), code division multiple access (CDMA), long-term evolution (LTE), internet protocol (IP), Orthogonal frequency division multiplexing (OFDM), orthogonal frequency division multiple access (OFDMA), and the like, and/or any combination thereof. Communications may involve point-to-multipoint (PtMP), multicast distribution, broadcast distribution, unicast distribution, and/or any combination thereof.

Centralized node 101 may comprise a buffer 110, which comprises data that may be communicated to or was received from remote units 130$a$-130$n$. Buffer 110 may be a downlink (DL) buffer and may be partitioned into respective buffers (e.g. 113-11A) that are associated with a respective remote unit. Each respective partitioned buffer (113-11A) may be partitioned such that it is operable to handle information of a certain traffic priority class type, such as high priority (HP) traffic, real-time voice and video traffic, streaming video traffic, best efforts (BE) traffic, and/or the like. For example, remote unit 130a may be associated with buffer 113 for handling remote unit 130a's BE traffic.

Furthermore, remote unit 130b may be associated with buffer 114 for handling remote unit 130b's HP traffic. Remote unit 130c may be associated with buffer 115 for handling remote unit 130c's HP traffic and buffer 116 for handling remote unit 130c's BE traffic. Remote unit 130n may be associated with buffer 117 for handling remote unit 130n's BE traffic and buffer 11A for handling remote unit 130n's HP traffic. Each remote unit may be dynamically associated with more or less buffers according to the number of traffic priority classes the remote unit is handling at any one time.

The various buffers may be nested buffers, virtually associated buffers, and/or the like as is desired. Alternatively, multiple buffers associated with the same node may not be nested together and may not be virtually associated with each other, if desired. The number of buffers may be dynamic in that one or more buffers may be added to or taken away from the system according to dynamic buffer allocations. Further, the size of each buffer may be dynamic in that the size of one or more buffer may be changed.

Some of the example buffers of FIG. 1 are shown as having a queue length which is indicative of the amount of data stored in the buffer at a particular time. The more data that is queued in the buffer at any given time, the longer the queue length. For example, at a given time, buffer 113 is shown as having a queue length of 133, buffer 114 is shown as having a queue length of 134, buffer 115 is shown as having a queue length of 135, buffer 116 is shown as having a queue length of 136, buffer 117 is shown as having a queue length of 137, buffer 11A is shown as having a queue length of 138. At any time during operation of the system, the various buffers (e.g., the UL buffers and DL buffers) may have varying queue lengths dependent on how much data is being stored in the particular buffer at that time.

Centralized node 101 may also comprise a traffic shaper 120 operable to shape traffic between the UL and DL buffers and to shape incoming traffic 122b and/or outgoing traffic 122a of the network. Traffic shaper 120 may be a dedicated processor or program code stored in a memory that is accessible by centralized node 101 and executed by a processor of centralized node 101. Traffic shaping may be used to ensure that the incoming traffic (and/or outgoing traffic) of each priority class is in line with its specified limits on the use of shared resources—e.g., maximum traffic rate and burstiness. This may be done through buffering the incoming traffic and releasing it to the system according to its specified traffic profile.

Likewise, one or more of the remote units may comprise a traffic shaper (e.g., 121a-121n) operable to shape traffic between the UL and DL buffers. Traffic shaper 121a-121n may be a dedicated processor or program code stored in a memory that is accessible by a respective remote unit and executed by a processor of the respective remote unit. Traffic shaping may be used to ensure that the incoming traffic (and/or outgoing traffic) of each priority class is in line with its specified limits on the use of shared resources—e.g., maximum traffic rate and burstiness. This may be done through buffering the incoming traffic and releasing it to the system according to its specified traffic profile.

The system 100 of FIG. 1 is operable to dynamically partition the centralized node's buffer space 110. Because other resource allocations of the system may be contingent on the queue lengths of the system's partitioned buffers, the total buffer space (TBS) associated with remote units may be allocated among remotes nodes based on at least one or more of the following: (a) the traffic priority class that each allocated buffer will handle, (b) the bandwidth needs of each respective buffer being allocated, and (c) a function of the traffic priority class that each allocated buffer will handle and the bandwidth needs of each respective buffer being allocated. Likewise, system 100 is also operable to dynamically partition each remote unit's buffer space (e.g., 131a-131n) in the same manner.

As discussed in U.S. application Ser. No. 13/284,669 entitled "METHOD AND SYSTEM FOR ADAPTIVE RESOURCE ALLOCATION," filed on Oct. 28, 2011, the disclosure of which is hereby incorporated herein by reference, centralized node 101 (or a processor in communication with centralized node 101) may perform adaptive resource allocation of resources other than buffer space (e.g., bandwidth allocation), and the other resource allocation may be based on the queue lengths of the partitioned buffers (e.g., partitioned buffers 113-11A and/or partitioned buffers 140-14A). The following example will be based on resource allocations on partitioned buffers 113-11A.

For instance, embodiments may allocate shared system bandwidth resources to various remote units based on their traffic demand. The traffic demand of each remote unit may be determined based on the average length of the respective remote unit's queues for various traffic flows. For a remote unit (e.g., remote unit 130c) with two classes of traffic (e.g., HP and BE), the overall queue length metric, $L_i$, of the remote unit may be determined by:

$$L_i = w_{HP} * L_{HP} + L_{BE} \quad (1)$$

where $L_{HP}$ and $L_{BE}$ are the queue lengths of the HP and BE queues for remote unit i, respectively, and $w_{HP}$ is a priority weight factor representing a priority given to the high priority (HP) traffic relative to the best efforts (BE) traffic in resource allocation. Equation (1) can be generalized to systems with multiple classes of traffic as follows:

$$L_i = \sum_{j=1}^{N} w_j L_{ij} \quad (2)$$

where $L_{ij}$ is a queue length for traffic class j at remote unit i, and $w_j$ is a priority weight factor of traffic class j. For this example, we assume that traffic classes are sorted in decreasing order of priority, with class 1 being the highest priority and class N being the lowest priority class. The traffic class with the lowest priority (e.g., BE traffic) has a priority weight factor of 1, e.g., $w_N=1$. For other classes we have $w_j>1$. The higher the priority, the larger the weight factor.

To determine the traffic demands for a set of remote units, centralized node 101 may compute an average queue length metric (denoted as $\overline{L_i}$) for each remote unit and may compare it against two queue length thresholds, namely $L_{low}$ and $L_{high}$, with $L_{low} \leq L_{high}$. The traffic demand of remote unit i is determined as low if $\overline{L_i} < L_{low}$, high if $\overline{L_i} > L_{high}$, and medium if $L_{low} \leq \overline{L_i} \leq L_{high}$. As such, the high queue length threshold is a queue length that triggers the system to allocate a larger amount of bandwidth to a remote unit (as compared to $L_{low}$), and a low queue length threshold is a queue length that triggers the system to allot a lesser amount of bandwidth to a remote unit (as compared to $L_{high}$).

After determining the traffic demands for a set of remote units, centralized node 101 may calculate the bandwidth share that each remote unit of the set of remote units will be allocated from the channel resources (for example, the number of symbols in time domain). It may be desirable to allocate most of the bandwidth resources first to remote units with high traffic demand, and then a moderate amount of bandwidth resources to units with medium traffic demand, and then remote units with low traffic demand may be given minimum bandwidth allocation.

As such, bandwidth allocation among the remote units may be based on the queue lengths of the DL buffers allocated to the respective remote units. Likewise, the above may be performed based on the queue lengths of the UL buffers of the remote units. Because bandwidth allocation may be based on queue length, the amount of space that a buffer is allocated may be directly related to the remote unit's bandwidth allocation. Therefore, it may be desirable to allocate buffer sizes in a manner that does not inadvertently skew resource allocation, as opposed to simply allocating the same buffer size to each remote unit.

Figure 2:
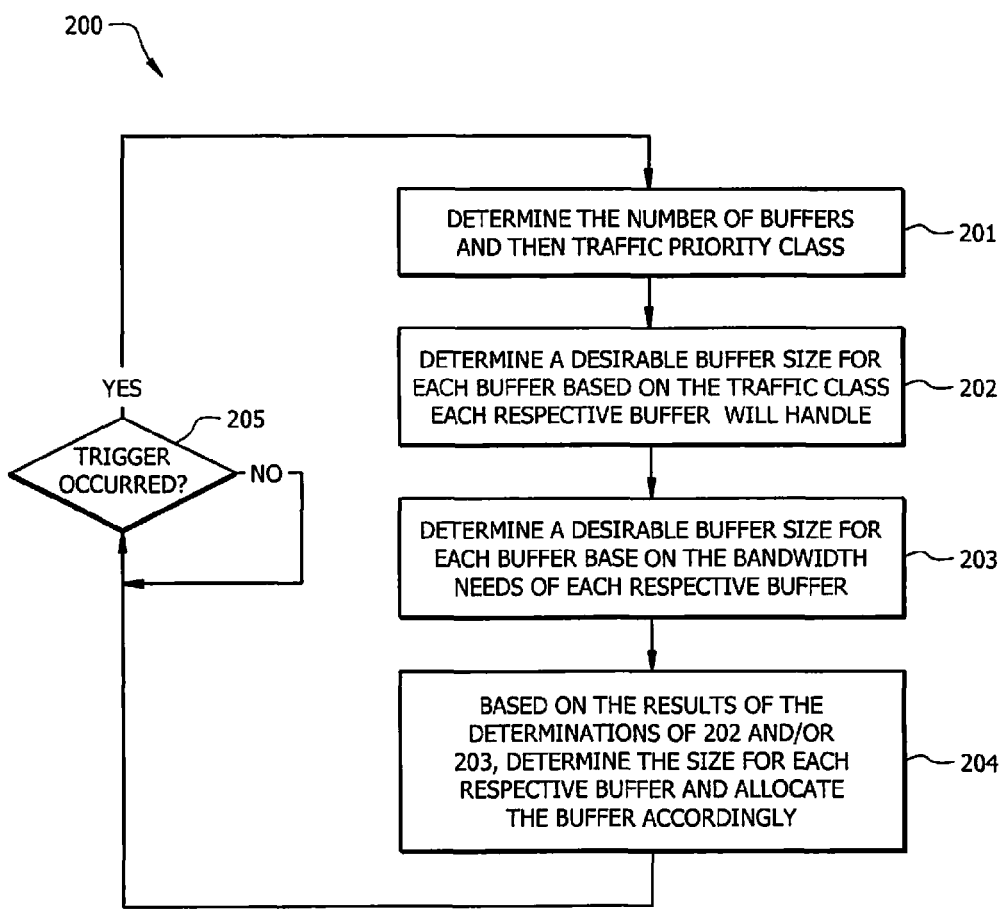
FIG. 2 is a flow diagram of an example of dynamic buffer space allocation that may be performed by embodiments disclosed herein.

FIG. 2 shows an example method of a system (e.g., system 100) intelligently allocating buffer space or reallocating the buffer space that was previously assigned to remote units. The following example will partition buffer 110 of centralized node 101. Method 200 may start with step 201 wherein a processor (e.g., centralized node 101) determines how many buffers are desirable at the time of allocation or reallocation and determines the respective traffic priority class that each determined buffer will handle. For example, the system may determine that four remote units are currently communicating with centralized node 101. Further, the system may determine that two of the remote units handle BE traffic, one of the remote units handles HP traffic, and one of the remote units handles BE traffic and HP traffic. If desired, the system may determine that it is appropriate to establish a buffer for each traffic class handled by each remote unit. In this example, the system may establish five buffers: one for the remote unit handling BE traffic, one for the other remote unit handling BE traffic, one for the remote unit handling HP traffic, and two buffers for the remote unit handing BE traffic and HP traffic. With the number of desirable buffers determined and their respective traffic classes determined, the method may move to step 202.

In step 202 (if performed may be performed before, after, or in parallel with step 203), the system determines a desirable buffer size for each buffer based on the traffic priority class each respective buffer will handle. More detail regarding step 202 will be addressed below with reference to FIG. 3.

In step 203 (if performed may be performed before, after, or in parallel with step 202), the system determines a desirable buffer size for each buffer based at least on the bandwidth requirements of each respective buffer. More detail regarding step 203 will be addressed below with reference to FIG. 4.

With the determinations of steps 202 and/or 203 determined, the method moves to step 204 wherein the system determines the buffer size that will be allocated to each respective buffer based at least on the determination of 202, or based at least on the determination of 203, or based at least on a function of the determinations of 202 and 203.

With the sizes of all the buffers determined, the system allocates the buffer space to each respective buffer, from the total buffer space (TBS).

With the buffers allocated (or reallocated), the system performs buffering operations including queuing incoming and outgoing traffic in the appropriate buffer where the queued data waits until its turn to be processed. While performing buffering operations, the system may watch for a triggering event, step 205. Upon the occurrence of a triggering event, the system may repeat steps 201-204 to reallocate buffer space. Some non-limiting examples of trigging events include, but are not limited to, a remote unit being added or taken away from the network (e.g., through a failure, administrative decision, scheduled or unscheduled maintenance, and/or the like); a traffic priority class change of one or more buffers; a buffer overflow; a time of day; a day of the year; an increase in data traffic in one or more buffers which breaches the high queue length threshold; a decrease in data traffic in one or more buffers that falls below the low queue length threshold; user input; and/or the like; and/or any combination thereof.

As such, FIG. 2 shows an example of allocating the buffer space of buffer 110. Method 200 may also be used to partition one or more buffers 131a-131n of one or more remote units 130a-130n.

Figure 3:
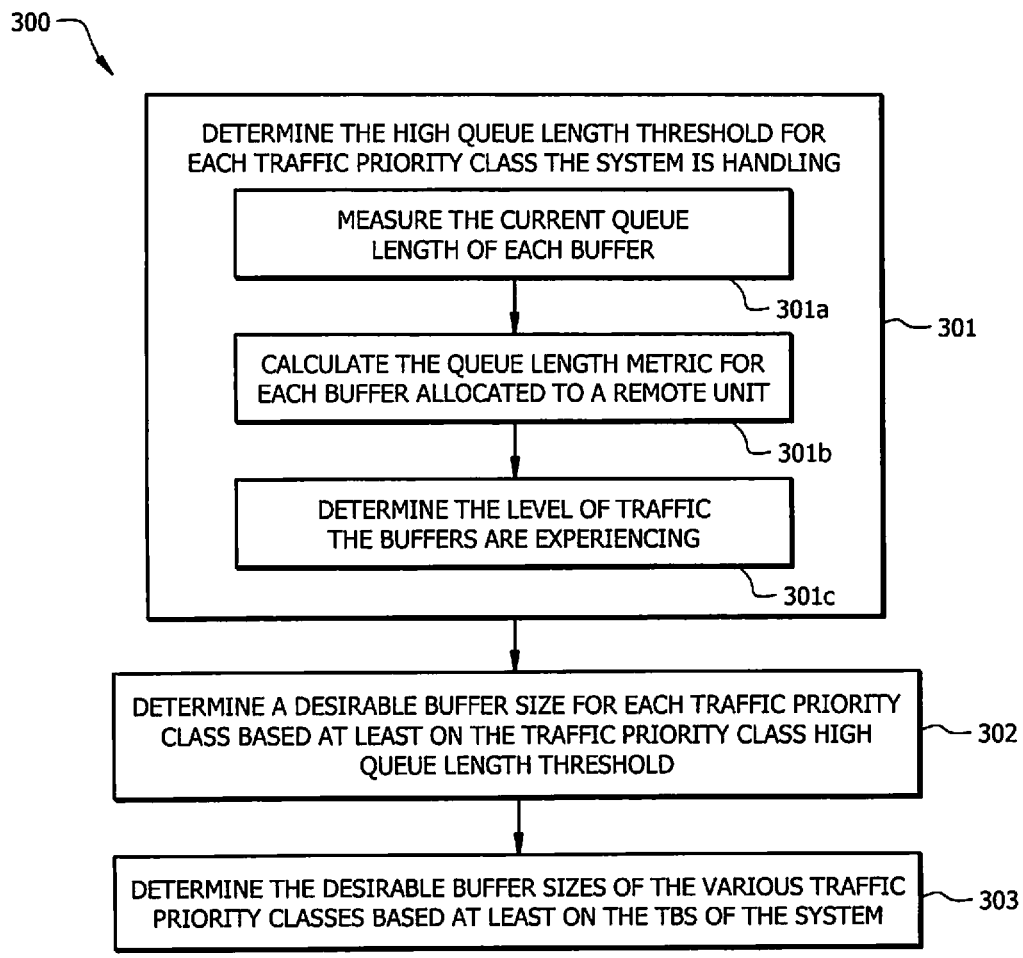
FIG. 3 is a flow diagram of an example of dynamic buffer space allocation that may be performed by embodiments disclosed herein.

FIG. 3 shows an example method 300 of a processor (e.g., centralized node 101, remote unit 130a, etc.), determining a desirable buffer size for each respective buffer based at least on the traffic priority class each allocated buffer will handle. Method 300 shows an example method of performing step 202 of FIG. 2 to partition buffer 110, but method 300 may also be used to partition one or more buffers 131a-131n of one or more remote units 130a-130n.

As an overview, when determining a desirable buffer size for each respective buffer based at least on the buffer's traffic priority class, at step 301, a processor (e.g., centralized node 101) may determine a high queue length threshold for each respective traffic priority class. The high queue length threshold is the threshold at which the system determines that a buffer is handling a high amount of traffic flow. It is desirable that the buffer space of a respective buffer be more than the high queue length threshold, so that the buffer may continue to operate after the high queue length threshold is breached (e.g., after the buffer begins experiencing high traffic flow). As such, at step 302, the system may multiply the determined high queue length threshold by a factor (e.g., K), such that the buffer handling a given traffic priority class may be sized at K times the high queue length threshold.

For example, when a remote unit experiences a burst of traffic coming into a respective buffer, the queue length begins to grow as data is queued in the respective buffer. Upon the queue length exceeding the high queue length threshold, a trigger occurs wherein the system determines that it is desirable to reallocate buffer space and/or other additional resources (e.g., trigger step 205). Depending on the congestion scenario, there may be a delay before the buffer is allocated additional buffer space or other additional resources. As such, in order to allow the buffer to continue to queue additional data after the high queue length threshold is breached but before reallocation of buffer space or other additional resources is completed, it is desirable that the buffer be allocated K times the high queue length threshold.

To make the detailed description of example method 300 easier to understand, the example will assume that step 201 of FIG. 2 determined that two buffers are desirable, one buffer for remote unit 130a handling BE traffic (e.g., BE buffer 113) and one buffer for remote unit 130b handling HP traffic (e.g., HP buffer 114). Of course, the method should not be limited to be operable on two buffers because the method is operable on any number of buffers associated with any number of remote units. System 100 is dynamically scalable such that any number of remote units may be added or taken away from system 100 and each remote unit may be allocated any number of buffers including multiple buffers for the same traffic class. Method 300 may be performed for each buffer which was determined to be desirable in step 201 of FIG. 2. The steps may be performed for each buffer consecutively, for each buffer in parallel, and/or any combination thereof.

Method 300 starts with 301 wherein the system determines a high queue length threshold, $L_{high,j}$, for each traffic priority class the system is handling. In this example, step 301 will determine a high queue length threshold for HP traffic and a high queue length threshold for BE because HP and BE are the two traffic priority classes being considered in this example. The high queue length threshold may be determined several different ways, such as a processor (e.g., centralized node 101) referencing a look up table having one or more high queue length thresholds, receiving user input indicating one or more high queue length thresholds, calculating one or more high queue length thresholds, and/or any combination thereof. As an example, when allocating buffer space of a system for the first time, the system may reference a look up table, use user input to determine one or more high queue length thresholds, and/or use the queue length thresholds of other systems. In other examples, such as reallocating buffer space which was previously been assigned, the system may determine the high queue length threshold by performing calculations.

In the following example, the system will determine the high queue length threshold by performing calculations. Such that the equations below can be easily understood, the variable i designates which remote unit is currently being considered in the calculations, and variable j ranging from 1 to N designates which traffic class is currently being considered in the calculations, e.g., j=1 designates HP traffic, j=2 designates medium priority traffic, j=3 designates less than medium priority traffic, and j=N designates BE traffic.

In step 301a, the system measures the current queue length of each currently allocated buffer of each remote unit i of a set of remote units. The set of remote units may be all of the remote units of the system or a subset of the remote units of the system. For example, if remote unit i is remote unit 130b, then HP buffer 114 may be buffer j. The measured current queue length of the remote unit 130b's current HP buffer may be denoted as $L_{ij}$. Using $L_{ij}$, a queue length metric, Li, for remote unit may be calculated, step 301b. According to Equation (2), the queue length metric of the buffer of remote unit 130b is equal to: $L_i=w_j L_{ij}$. With the queue length metric determined, step 301c determines the level of traffic demand that the current buffer associated with the remote unit is currently experiencing. For example, buffer 114 associated with remote unit 130b will be considered to have high traffic demand if $Li>L_{high}$. In embodiments, the method may use the traffic priority class's average queue length metric to determine the traffic priority class's average buffer demand, and buffers may be considered to have high traffic demand if $\overline{L_i}>L_{high}$. This would happen if $\overline{L_{ij}}>L_{high}/w_j$. Accordingly, the high queue length threshold for traffic class j is equal to: $L_{high}^j=L_{high}/w_j$.

With the high queue length thresholds determined for the various traffic priority classes, method 300 moves to step 302, which determines a desirable buffer size for each traffic priority class based at least on the traffic priority class' determined high queue length threshold. In the present example, remote unit 130a and remote unit 130b each have a different priority class of traffic. In order to ensure that each of the remote units continue to queue data after an increase in traffic demand, it is desirable that the buffer size, Q, for each class of traffic be greater than the buffer's high queue length threshold, e.g., $Q_j>L_{high}^j$, where $Q_j$ is the buffer size for traffic class j.

As such, a processor (e.g., centralized node 101) determines a desirable buffer size for each of the traffic priority classes in question. In this example, the system chooses buffer sizes such that $Q_j$ is proportional to $L_{high}^j$, that is $Q_j=K*L_{high}^j$. In embodiments, K may be a constant value greater than 1, which is the same for all traffic classes. In alternative embodiments, K may be any value (including a sliding value, non-integer, etc.) as is desired. Setting the buffer size for a traffic class to $Q_j=K*L_{high}^j$ allows each buffer to hold traffic that is K times its high queue length threshold. As discussed above, in situations where the high traffic demand of remote units triggers a buffer or other resource allocation change (step 205), this allows traffic buffering for each service class up to K times its high queue length threshold.

The determined desired buffer size can be written as:

$$Q_j=K*L_{high}/w_j \quad (3)$$

Accordingly, the determined desired buffer size for each traffic class may be inversely proportional to its priority weight factor, $w_j$. This is shown in FIG. 1 for remote units 130a and 130b, wherein remote unit 130a has the lowest priority traffic class N and remote unit 130b has a higher priority class j. As demonstrated in FIG. 1, traffic class j is assigned a smaller buffer size since a shorter queue length can trigger the high traffic demand indication, which would increase its resource allocation. Therefore, less data would typically be buffered in its queue as compared to traffic class N, and hence a smaller buffer size may be allocated to buffer 114, $Q_j$ as compared to $Q_N$.

Because $w_N$ is the priority weight factor for the lowest priority traffic class (e.g., BE traffic), $w_N$ may be assigned the lowest priority weight factor. For example, $w_N$ may be assigned to the constant value 1. When $w_N=1$, it is derived from Equation (3) that:

$$Q_j=Q_N/w_j \quad (4)$$

Therefore, the total allocated buffer size of the system can be written as:

$$\sum_{k=1}^{N} M_k Q_k = Q_N \sum_{k=1}^{N} \frac{M_k}{W_k} \quad (5)$$

where $M_k$ denotes the number of buffers allocated in the system with traffic class k. For example, if two buffers are assigned for HP traffic class to two remote units with HP traffic at centralized node 101, then $M_1=2$ may be used in Equation (5).

With the desirable buffer sizes of the various traffic classes determined, the processor (e.g., centralized node 101) may determine the desirable buffer sizes for each of the buffers in light of the total buffer size (TBS) available in the system, step 303. The sum of the buffer sizes for the various traffic classes is the total buffer size allocated to all of the buffers, denoted as TBS. It may be derived from Equation (5) that:

$$Q_j = TBS * \frac{\frac{1}{w_j}}{\sum_{k=1}^{N} \frac{M_k}{w_k}} \quad (6)$$

As such, Equation (6) may be used to calculate a desirable buffer size for each respective buffer handling traffic for a remote unit based at least on the traffic priority class each respective buffer will handle. With this buffer size determined (step 202 of FIG. 2), the system may allocate the buffers according to the buffer size determined in step 202. Alternatively, the system may perform step 203 before allocating buffer size.

As such FIG. 3 shows an example of allocating the buffer space of buffer 110. Method 300 may also be used to allocate the buffers (e.g., buffers 131a-131n) of the remote units 130a-130n.

Figure 4:
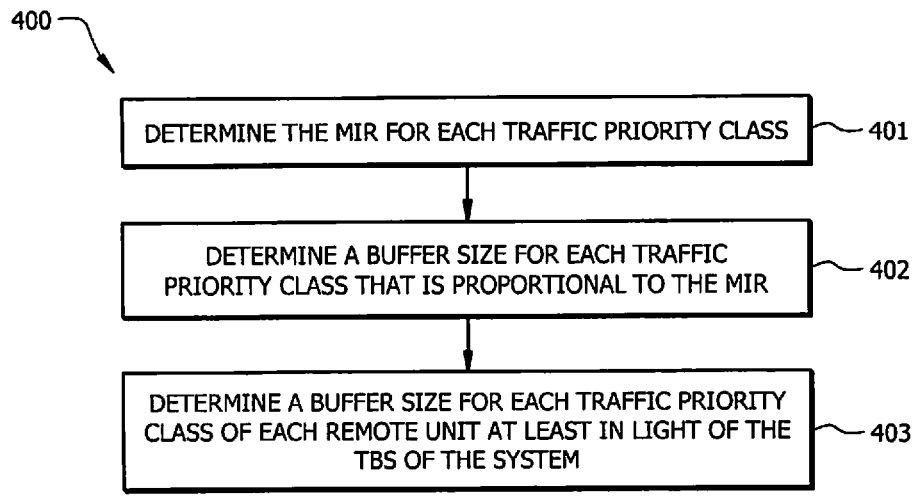
FIG. 4 is a flow diagram of an example of dynamic buffer space allocation that may be performed by embodiments disclosed herein.

FIG. 4 shows an example method of a processor (e.g., centralized node 101, remote unit 130a, etc.), determining a desirable buffer size for buffers based on the bandwidth needs of each respective traffic priority class. Method 400 shows an example manner of performing step 203 of FIG. 2 to allocate the buffer space of buffer 110. Method 400 may also be used to allocate the buffers (e.g., buffers 131a-131n) of the remote units 130a-130n.

Each traffic priority class of a system may have a maximum information rate (MIR) that may be enforced by traffic shaper 120. For each traffic priority class, the system may allocate enough bandwidth to satisfy the traffic priority class's MIR in order to ensure that the traffic data class is being serviced according its specified data rate limits. Determining a desirable buffer size for buffers based on the bandwidth needs of each respective traffic priority class may start in step 401 where a processor (e.g., centralized node 101, traffic shaper, and/or the like) determines the MIR for each traffic priority class being considered at the time. The MIR may be determined by referencing a look up table having one or more MIRs, receiving user input indicating one or more MIRs, calculating one or more MIRs, and/or any combination thereof.

With the MIRs determined, the processor (e.g., centralized node 101) may determine a desirable buffer size for each traffic priority class is a buffer size that is proportional to the MIR, step 402. An example, may be $$Q_j = T * MIR_j \quad (7)$$

where $MIR_j$ is the maximum information rate enforced by traffic shaping for traffic class j, and T is a value (e.g., a constant value). If T is set to be seconds, then each buffer can hold T seconds worth of traffic at the maximum permitted information rate of the buffer's respective traffic priority class. Given a total buffer size (TBS) of the centralized node 101, the buffer size for each traffic class of each remote unit, in light of the TBS, may be determined (in step 403) as:

$$Q_j = TBS * \frac{MIR_j}{\sum_{k=1}^{N} M_k MIR_k} \quad (8)$$

As such FIG. 4 shows an example of allocating the buffer space of buffer 110. Method 400 may also be used to allocate the buffers (e.g., buffers 131a-131n) of the remote units 130a-130n.

Figure 5:
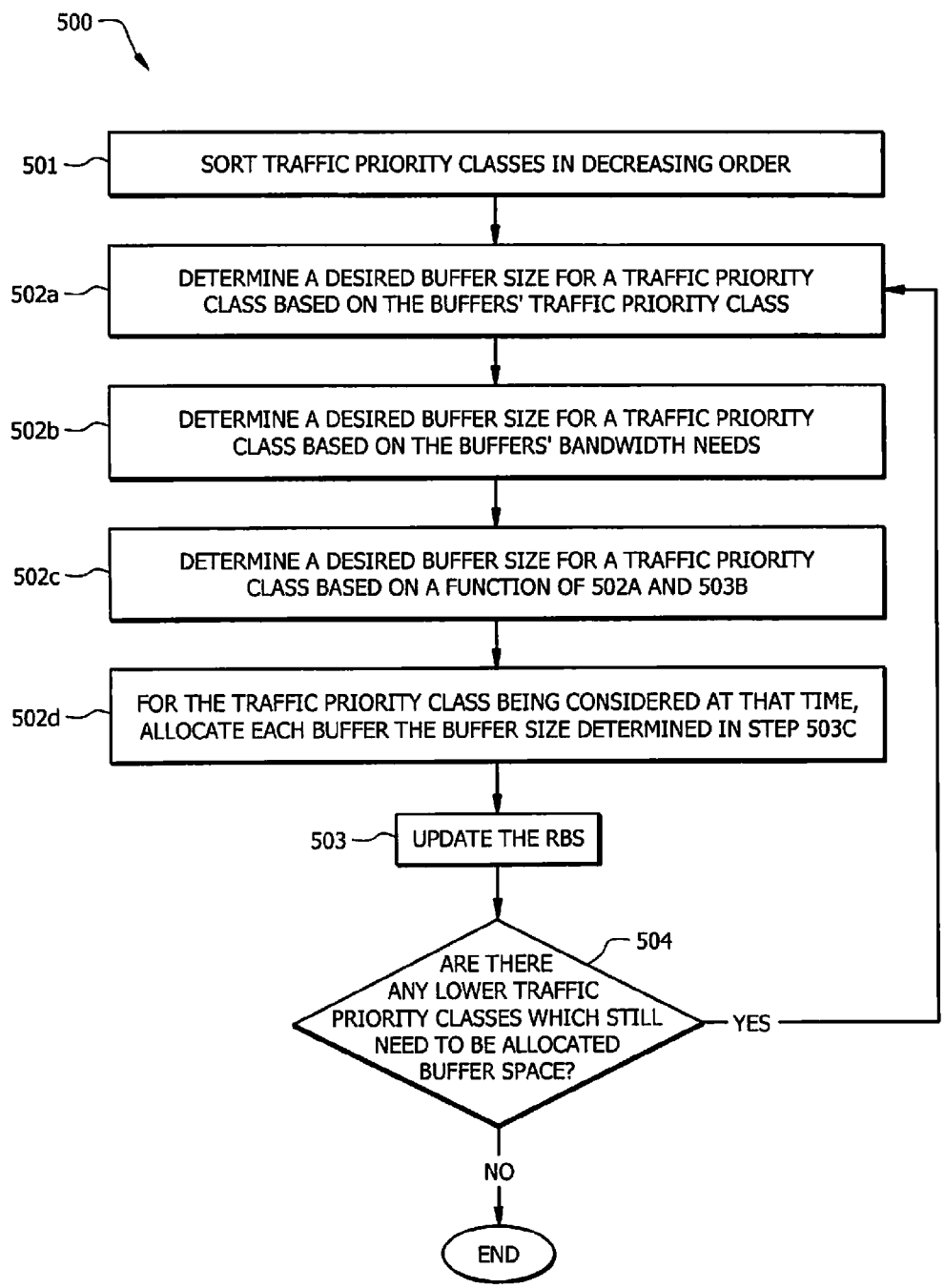
FIG. 5 is a flow diagram of an example of dynamic buffer space allocation that may be performed by embodiments disclosed herein.

Equations (6) and (8) capture exemplary buffer allocation methods based on either (step 202) the traffic priority class of each respective buffer or (step 203) the bandwidth needs of each traffic priority class, respectively. FIG. 5 shows example method 500, which may base buffer reallocation at least on determinations of both steps 202 and 203, wherein the reallocated buffer sizes may be a function of the two buffer sizes determined using Equations (6) and (8). FIG. 5 shows an embodiment of step 204 of FIG. 2 allocating the buffer space of buffer 110. Method 500 may also be used to allocate the buffers (e.g., buffers 131a-131n) of the remote units 130a-130n.

In embodiments, method 500 may let $w=[w_1, w_2, \ldots, w_N]$ be a vector of priority weight factors used in adaptive resource allocation. Further, the method may let MIR= $[MIR_1, MIR_2, \ldots, MIR_N]$ be a vector of maximum data rates enforced by traffic shaping. Moreover, as described above, TBS may be the total buffer size allocated to the remote units of the system. RBS may represent the remaining buffer size during buffer allocation. In embodiments, the remaining buffer size (RBS) may be updated after each iteration of the buffer allocation, and the final RBS may be used for allocation to the lowest priority traffic classes. Before any buffer space is allocated, the remaining buffer size is the total buffer size; thus, RBS may be initialize as TBS: RBS=TBS, before buffer reallocation begins.

Method 500 may begin with a processor (e.g., centralized node 101) sorting traffic classes in decreasing order of priority from 1 to N, step 501. Steps 502a-504 may be repeated for each of the sorted list of traffic classes. In embodiments, the processor may start with the highest priority class and do the followings for each traffic class j, j=1, 2, . . . , N−1:

At step 502a, the processor may determine the buffer size for traffic class j based on its traffic priority class, $Q_j^P$:

$$Q_j^P = RBS * \frac{\frac{1}{w_j}}{\sum_{k=j}^{N} \frac{M_k}{w_k}} \quad (9)$$

At step 502b, the processor may determine a desirable buffer size for traffic class j based on its bandwidth requirement, $Q_j^{MIR}$:

$$Q_j^{MIR} = RBS * \frac{MIR_j}{\sum_{k=j}^{N} M_k MIR_k} \quad (10)$$

At step 502c, the processor may calculate a buffer size for traffic class j as a function of the two buffer sizes determined above:

$$Q_j = f(Q_j^P, Q_j^{MIR}) \quad (11)$$

where $f(\ )$ represent a function of the two values: $Q_j^P, Q_j^{MIR}$.

In some embodiments, the function $f(\ )$ may result in setting a as being equal to the larger determined queue of the two queue sizes being considered. In this example, if $Q_j^P > Q_j^{MIR}$, then $Q_j$ may be set to $Q_j^P$. Conversely, if $Q_j^P < Q_j^{MIR}$, then $Q_j$ may be set to $Q_j^{MIR}$. Likewise if $Q_j^P = Q_j^{MIR}$, then $Q_j$ may be set to $Q_j^P$ or $Q_j^{MIR}$, since they are the same value.

In some embodiments, the function f( ) may result in setting $Q_j$ as being equal to the smaller determined queue of the two queue sized being considered. In this example, if $Q_j^P < Q_j^{MIR}$, then $Q_j$ may be set to $Q_j^P$. Conversely, if $Q_j^P > Q_j^{MIR}$, then $Q_j$ may be set to $Q_j^{MIR}$. Likewise if $Q_j^P = Q_j^{MIR}$, then $Q_j$ may be set to $Q_j^P$ or $Q_j^{MIR}$, since they are the same value.

In some embodiments, the function f( ) may result in setting $Q_j$ as being equal to an average of the two queue sizes being considered. In this example, a may be set as equal to the average of $Q_j^P$ and $Q_j^{MIR}$.

In some embodiments, the function f( ) may result in setting $Q_j$ as being equal to a weighted average of the two queue sizes being considered. For example, a weight W may be applied to $Q_j^P$, and $Q_j$ may be set as equal to the average of $W*Q_j^P$ and $Q_j^{MIR}$. In another example, a weight W may be applied to $Q_j^{MIR}$, and $Q_j$ may be set as equal to the average of $Q_j^P$ and $W*Q_j^{MIR}$. When weights are used, it allows the system to prioritize one of the determined queue sizes (e.g., the queue size based on traffic priority or the queue size based on bandwidth needs) over the other. Of course weights may be used in any function f( ) if desired.

Other functions may be used to determine how to allocate buffer size based on a function of $Q_j^P$ and $Q_j^{MIR}$. Thus, the present embodiment should not be limited to the examples provided above.

With the desired buffer size of traffic priority class j determined in step 502c, step 502d, allocates the determined desired buffer size to all buffers handling traffic priority class j.

In step 503, the processor (e.g., centralized node 101) updates the remaining buffer size:

$$RBS = RBS - Q_j * M_j$$

wherein $Q_j$ is the selected buffer size and $M_j$ is the number of buffers determined to be needed for priority class $_j$.

In step 504, the processor determines whether there are any lower traffic priority classes to which buffer space may be allocated, e.g., $Q_N$. If there are lower traffic priority classes (e.g., medium priority traffic classes, BE priority traffic classes, etc.), then method 500 moves back to step 502a and repeats steps 502a-504 for the lower traffic priority class. For example, if it was determined that a medium priority traffic class should be allocated buffer space, then the method would repeat steps 502a-504 for the medium traffic priority class, and move through steps 503 and 504 where the system would again determine whether there are any lower traffic priority classes which should be allocated buffer space.

If at step 504, the processor determines that there are no more lower traffic priority classes which should be allocated buffer space, then method 500 would end, and the system may wait for a triggering event to occur as described in step 205.

In some embodiments, step 504 may determine that all the traffic priority classes, except for the lowest traffic priority class of the set (e.g., BE traffic), have been allocated buffer space. In this example, when the processor determines that all of the priority traffic classes but one have been allocated buffer space, the processor may skip steps 502a-504 and instead allocate the remaining buffer size RBS to the buffers of the lowest priority traffic class of the set:

$$Q_N = RBS/M_N$$

Note that because step 503 updates the RBS in between each iteration of the buffer space allocation, the current RBS may be taken into consideration when allocating buffer space, which aids in the prevention of the buffer space being over allocated.

In short, embodiments herein contemplate several methods of allocating buffer space including allocating buffer space based at least on the buffers' traffic priority class (detailed in FIG. 3), allocating buffer space based at least on the buffers' bandwidth needs (detailed in FIG. 4), or allocating buffer space based at least on a function of the buffers' traffic priority class and the buffers' bandwidth allocation needs (detailed in FIG. 5). Allocating buffer space, as described herein, aids in other system allocation schemes, for example, system allocation schemes which are contingent on the buffers' queue lengths.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of resource allocation comprising:
    determining, by a centralized node adapted to provide backhaul data services for a network, traffic priority classes for data associated with one or more remote units, wherein the centralized node comprises a buffer, and wherein the buffer of the centralized node is partitioned into a plurality of buffer partitions, each buffer partition of the plurality of buffer partitions corresponding to a particular traffic priority class for data traffic associated with a particular remote unit of the one or more remote units;
    determining, by the centralized node, a data rate limit corresponding to each of the traffic priority classes, wherein the data rate limit for a particular traffic priority class indicates a maximum information rate enforced by a traffic shaping node of the network;
    determining a first desirable buffer size for each buffer partition of the plurality of buffer partitions, wherein the first desirable buffer size for each of the buffer partitions of the plurality of buffer partitions is determined based on, and is proportional to, a maximum information rate for data traffic of the traffic priority class corresponding to each of the plurality of buffer partitions, said determining the first desirable buffer size for each buffer partition of the plurality of buffer partitions being according to:

$$Q_j = TBS \times \frac{MIR_j}{\sum_{k=1}^{N} M_k MIR_k},$$

where $Q_j$ represents the first desirable buffer size for a buffer partition for a traffic priority class j, TBS represents the total buffer size, and $MIR_j$ represents the data rate limit for the traffic priority class j, $M_k$ represents the number of buffer partitions allocated for a traffic priority class k, and $MIR_k$ represents the data rate limit for the buffer partition k of the $M_k$ buffer partitions, and $\Sigma_{k=1}^{N} M_k MIR_k$ represents a total bandwidth need for all buffer partitions for traffic priority class k; and allocating, by the centralized node, buffer space for each buffer partition of the plurality of buffer partitions based on the first desirable buffer size determined for each of the buffer partitions.

2. The method of claim 1 wherein the centralized node comprises a processor or a remote unit comprises a processor adapted to determine the traffic priority classes, the data rate limit corresponding to each of the traffic priority classes, and the first desirable buffer size for each buffer partition and to allocate buffer space to each buffer partition of the plurality of buffer partitions.

3. The method of claim 2 wherein said buffer space allocation is further based at least on a total buffer space.

4. A system operable to allocate system resources comprising:
a plurality of buffers operable to buffer data traffic, wherein each buffer is associated with one of a plurality of traffic priority classes; and
a processor operable to:
determine a high queue length threshold for each traffic priority class in said plurality of traffic priority classes, wherein, for each of said plurality of traffic priority classes, said high queue length threshold represents a high level of traffic flow;
determine a first desirable buffer size for each buffer of said plurality of buffers based at least on said high queue length threshold for each traffic priority class; and
allocate buffer space to each respective buffer based at least on said determined first desirable buffer size, wherein, for each respective buffer, said buffer space allocation accounts for spikes in data traffic by providing an allocation of buffer space for each of said plurality of buffers that is greater than the high queue length, said determining the first desirable buffer size for each buffer partition of the plurality of buffer partitions being according to:

$$Q_j = TBS \times \frac{MIR_j}{\sum_{k=1}^{N} M_k MIR_k},$$

where $Q_j$ represents the first desirable buffer size for a buffer partition for a traffic priority class j, TBS represents the total buffer size, and $MIR_j$ represents the data rate limit for the traffic priority class j, $M_k$ represents the number of buffer partitions allocated for a traffic priority class k, and $MIR_k$ represents the data rate limit for the buffer partition k of the $M_k$ buffer partitions, and $\Sigma_{k=1}^{N} M_k MIR_k$ represents a total bandwidth need for all buffer partitions for traffic priority class k.

5. The system of claim 4 wherein the processor is further operable to determine the first desirable buffer size for each buffer to account for spikes in traffic by multiplying the high queue length threshold by a factor (K) such that each of said plurality of buffers is sized K times the high queue length threshold.

6. The system of claim 5 wherein a centralized node comprises the processor or a remote unit comprises the processor.

7. The system of claim 4 wherein the processor is further operable to allocate other system resources based at least on queue lengths of said buffers, wherein said buffer space allocation does not cause the other resource allocation to allocate other resources such that system needs are not met.

8. The system of claim 4 wherein the processor is further operable to:
determine a second desirable buffer size for each buffer of the plurality of buffers based at least on the bandwidth needs of the respective buffers;
determine a functional desirable buffer size for each buffer of the plurality of buffers based at least on a function of the first desirable buffer size and the second desirable buffer size; and
allocate buffer space to each respective buffer based at least on said determined functional desirable buffer size.

9. The system of claim 8 wherein the second desirable buffer size is based at least on a maximum information rate of each said traffic priority class.

10. The system of claim 4 wherein the processor allocates the buffer space to each respective buffer based at least on a total buffer space.

11. A system allocating resources comprising:
means for determining a first desirable buffer size for each buffer of a plurality of buffers based at least on a traffic priority class of the respective buffer;
means for determining a second desirable buffer size for each buffer of the plurality of buffers based at least on the bandwidth needs of the respective buffer;
means for determining a functional desirable buffer size for each buffer of the plurality of buffers based at least on a function of the first desirable buffer size and the second desirable buffer size, wherein, for a particular buffer of the plurality of buffers, the functional desirable buffer size is determined based on a function of a first desirable buffer size determined for the particular buffer based at least on a traffic priority class of the particular buffer and a second desirable buffer size determined for the particular buffer based at least on bandwidth needs of the particular buffer, said determining the functional desirable buffer size for each buffer partition of the plurality of buffer partitions being according to:

$$Q_j = TBS \times \frac{MIR_j}{\sum_{k=1}^{N} M_k MIR_k},$$

where $Q_j$ represents the first desirable buffer size for a buffer partition for a traffic priority class j, TBS represents the total buffer size, and $MIR_j$ represents the data rate limit for the traffic priority class j, $M_k$ represents the number of buffer partitions allocated for a traffic priority class k, and $MIR_k$ represents the data rate limit for the buffer partition k of the $M_k$ buffer partitions, and $\Sigma_{k=1}^{N} M_k MIR_k$ represents a total bandwidth need for all buffer partitions for traffic priority class k; and means for allocating buffer space to each respective buffer based at least on said determined functional desirable buffer size.

12. The system of claim 11 further comprising:
means for determining a high queue length threshold for each said traffic priority class, wherein determining the first desirable buffer size for each buffer is based at least on the high queue length threshold.

13. The system of claim 12 wherein determining the high queue length threshold comprises at least one of:
performing calculations; and
referencing a lookup table.

14. The system of claim 11 wherein the second desirable buffer size is based at least on a maximum information rate of each said traffic priority class.

15. The system of claim 11 wherein allocating the buffer space to each respective buffer is further based at least on a total buffer space.

16. The system of claim 11 further comprising:
means for allocating other system resources based at least on queue lengths of said buffers, wherein said buffer space allocation does not cause the other resource allocation to allocate other resources such that system needs are not met.

* * * * *